United States Patent
Wang (10) Patent No.: US 12,072,579 B2
(45) Date of Patent: Aug. 27, 2024

(54) BACKLIGHT MODULE AND DISPLAY DEVICE

(71) Applicant: HUIZHOU CHINA STAR OPTOELECTRONICS DISPLAY CO., LTD., Guangdong (CN)

(72) Inventor: Jiao Wang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 0 days.

(21) Appl. No.: 17/754,254

(22) PCT Filed: Feb. 25, 2022

(86) PCT No.: PCT/CN2022/077981
§ 371 (c)(1),
(2) Date: Mar. 29, 2022

(87) PCT Pub. No.: WO2023/151136
PCT Pub. Date: Aug. 17, 2023

(65) Prior Publication Data
US 2024/0053637 A1    Feb. 15, 2024

(30) Foreign Application Priority Data
Feb. 14, 2022   (CN) .......... 202210151015.2

(51) Int. Cl.
*G02F 1/00*       (2006.01)
*G02F 1/1335*     (2006.01)
*G02F 1/13357*    (2006.01)

(52) U.S. Cl.
CPC .. *G02F 1/133614* (2021.01); *G02F 1/133603* (2013.01); *G02F 1/133605* (2013.01)

(58) Field of Classification Search
CPC ........ G02F 1/133614; G02F 1/133603; G02F 1/133605
See application file for complete search history.

(56) References Cited

U.S. PATENT DOCUMENTS

2005/0185112 A1*  8/2005  Hara .............. G02B 6/005
                                                349/61
2016/0004124 A1*  1/2016  Benoit ............ G02F 1/1336
                                                349/71

(Continued)

FOREIGN PATENT DOCUMENTS

CN    1582410 A    2/2005
CN    1613028 A    5/2005

(Continued)

OTHER PUBLICATIONS

International Search Report in International application No. PCT/CN2022/077981, mailed on Nov. 11, 2022.

(Continued)

*Primary Examiner* — Gerald J Sufleta, II
(74) *Attorney, Agent, or Firm* — PV IP PC; Wei Te Chung; Zhigang Ma (57) ABSTRACT

The present application provides a backlight module and a display device, including a light source component, a quantum dot component, and a wavelength-band-light-reflecting component being arranged in a stack. The wavelength-band-light-reflecting component reflects light emitted by the quantum dot component in a specific band range, so as to reduce full width at half maximum of the light. The present application reduces the full width at half maximum of monochromatic light by arranging the wavelength-band-light-reflecting component reflecting light in the specific band range, thereby increasing gamut of a display module.

16 Claims, 2 Drawing Sheets

(56) References Cited

U.S. PATENT DOCUMENTS

| | | | |
|---|---|---|---|
| 2020/0319393 A1* | 10/2020 | Choi | G02B 6/005 |
| 2021/0271135 A1* | 9/2021 | Iwamoto | G02F 1/133603 |
| 2023/0168541 A1* | 6/2023 | Allen | G02F 1/133614 |
| | | | 349/64 |

FOREIGN PATENT DOCUMENTS

| | | |
|---|---|---|
| CN | 103676288 A | 3/2014 |
| CN | 105093685 A | 11/2015 |
| CN | 105452945 A | 3/2016 |
| CN | 105785649 A | 7/2016 |
| CN | 106526949 A | 3/2017 |
| CN | 106681055 A | 5/2017 |
| CN | 108735788 A | 11/2018 |
| CN | 108957860 A | 12/2018 |
| CN | 109581733 A | 4/2019 |
| CN | 111077698 A | 4/2020 |
| CN | 210323676 U | 4/2020 |
| JP | 2020181061 A | 11/2020 |

OTHER PUBLICATIONS

Written Opinion of the International Search Authority in International application No. PCT/CN2022/077981, mailed on Nov. 11, 2022.
Chinese Office Action issued in corresponding Chinese Patent Application No. 202210151015.2 dated Nov. 29, 2022, pp. 1-7.

* cited by examiner

BACKLIGHT MODULE AND DISPLAY DEVICE

FIELD OF INVENTION

The present application relates to a technical field of display, and specifically to a backlight module and a display device.

BACKGROUND OF INVENTION

As an important indicator to measure color performance of liquid crystal display products, gamut has attracted more and more attention from ordinary consumers and manufacturers. In order to improve the gamut of liquid crystal display products, major manufacturers can be said to come up with their own ideas.

Because current mainstream high-end liquid crystal display products all use blue light emitting diodes (light emitting diodes, LEDs) and backlight source components of quantum dot component films (quantum dot components, QD) to improve the gamut of display products, but due to limitations of quantum dot component materials, full widths at half maximum of light cannot be narrower, and the gamut of LCD display products cannot be made higher.

SUMMARY OF INVENTION

The present application provides a backlight module and a display device. A technical problem solved by embodiments of the present application includes low gamut of display modules in the prior art.

To solve the above problem, a first aspect of the present application provides a backlight module, the backlight module comprises:
 a light source component;
 a quantum dot component, the quantum dot component arranged above the light source component to receive light emitted by a light source;
 a wavelength-band-light-reflecting component, the wavelength-band-light-reflecting component arranged above the quantum dot component, the wavelength-band-light-reflecting component reflecting light in a specific band range to reduce full width at half maximum of the light.

According to an embodiment of the present application, the wavelength-band-light-reflecting component comprises:
 a substrate layer;
 a reflective layer, the reflective layer arranged above the substrate layer and the substrate layer supporting the reflective layer, the reflective layer reflecting light in a specific band range;
 a passivation layer, the passivation layer arranged above the reflective layer to protect the reflective layer.

According to an embodiment of the present application, the reflective layer includes a plurality of sub-reflective layers, and different sub-reflective layers of the plurality of sub-reflective layers are used for reflecting light in different band ranges.

According to an embodiment of the present application, refractive indices corresponding to the plurality of sub-reflective layers are different.

According to an embodiment of the present application, a number of the sub-reflective layers is three, different sub-reflective layers of the three sub-reflective layers are used for reflecting light in different band ranges, respectively.

According to an embodiment of the present application, the reflective layer includes a plurality of sub-reflective layers, and refractive indices of different sub-reflective layers of the plurality of sub-reflective layers are identical.

According to an embodiment of the present application, the reflective layer includes a plurality of sub-reflective layers, and a number of the plurality of sub-reflective layers is customized and randomly set.

According to an embodiment of the present application, a thickness of the reflective layer is 240 microns to 400 microns.

According to an embodiment of the present application, the wavelength-band-light-reflecting component further includes a light-emitting layer, the light-emitting layer is arranged above the passivation layer to enhance light emitted by the reflective layer.

According to an embodiment of the present application, the backlight module further includes a light diffusing component, the light diffusing component is arranged above the light source component and configured to create a uniform planar light source.

To solve the above problems, a second aspect of the present application provides a display device, which includes: the display device comprises a display panel and the backlight module mentioned above, the backlight module emits light to the display panel to make the display panel display a picture;
 the backlight module comprises:
 a light source component;
 a quantum dot component, the quantum dot component arranged above the light source component to receive light emitted by a light source;
 a wavelength-band-light-reflecting component, the wavelength-band-light-reflecting component arranged above the quantum dot component, the wavelength-band-light-reflecting component reflecting light in a specific band range to reduce full width at half maximum of the light.

According to an embodiment of the present application, the wavelength-band-light-reflecting component comprises:
 a substrate layer;
 a reflective layer, the reflective layer arranged above the substrate layer and the substrate layer supporting the reflective layer, the reflective layer reflecting light in a specific band range;
 a passivation layer, the passivation layer arranged above the reflective layer to protect the reflective layer.

According to an embodiment of the present application, the reflective layer includes a plurality of sub-reflective layers, and different sub-reflective layers of the plurality of sub-reflective layers are used for reflecting light in different band ranges.

According to an embodiment of the present application, refractive indices corresponding to the plurality of sub-reflective layers are different.

According to an embodiment of the present application, a number of the sub-reflective layers is three, different sub-reflective layers of the three sub-reflective layers are used for reflecting light in different band ranges, respectively.

According to an embodiment of the present application, the reflective layer includes a plurality of sub-reflective layers, and refractive indices of different sub-reflective layers of the plurality of sub-reflective layers are identical.

According to an embodiment of the present application, the reflective layer includes a plurality of sub-reflective layers, and a number of the plurality of sub-reflective layers is customized and randomly set.

According to an embodiment of the present application, a thickness of the reflective layer is 240 microns to 400 microns.

According to an embodiment of the present application, the wavelength-band-light-reflecting component further includes a light-emitting layer, the light-emitting layer is arranged above the passivation layer to enhance light emitted by the reflective layer.

According to an embodiment of the present application, the backlight module further includes a light diffusing component, the light diffusing component is arranged above the light source component and configured to create a uniform planar light source.

The present application provides a backlight module and a display device. The backlight module includes a light source component, a quantum dot component and a wavelength-band-light-reflecting component arranged in a stack. The wavelength-band-light-reflecting component can reflect light emitted by the quantum dot component in a specific wavelength range, reducing the full width at half maximum of the light, the smaller the full width at half maximum of the light is, the purer the monochromatic light is, and the more color light the display module can display, that is, the higher gamut of the display module is. The present application reduces the full width at half maximum of the monochromatic light by arranging the wavelength-band-light-reflecting component that reflects light in a specific wavelength range, thereby increasing the gamut of the display module.

BRIEF DESCRIPTION OF DRAWINGS

To illustrate the technical solutions in the embodiment of the present application more clearly, the accompanying drawings used in the description of the embodiment are briefly introduced as follows. Obviously, the accompanying drawings in the following description are only some embodiment of the present application. For those skilled in the art, other drawings can also be obtained from these drawings without creative effort.

DETAILED DESCRIPTION OF PREFERRED EMBODIMENT

A technical solution in the embodiment of the present application will be clearly and completely described below with reference to accompanying drawings in the embodiment of the present application. Obviously, described embodiments are only some, but not all embodiments of the present application. Based on the embodiment of the present application, all other embodiments obtained by those skilled in the art without creative efforts shall fall within the protection scope of the present application.

In the description herein, it can be understood that terms such as "center," "longitudinal," "lateral," "length," "width," "thickness," "upper," "lower," "front," "rear," "left," "right," "vertical," "horizontal," "top," "bottom," "inside," "outside," instruct a relationship of orientation or position based on the orientation or positional relationship shown in the accompanying drawings, it is only for convenience of describing the present application and simplifying the description, rather than indicating or implying that a referred device or element has a specific orientation or is constructed and operated in a specific orientation. Therefore, it should not be construed as a limitation of the present application. In the description herein, it should be understood that terms such as "first" and "second" are only used for descriptive purposes and cannot be interpreted as indicating or implying relative importance or implicitly indicating a number of indicated technical features. So features defined as "first" and "second" may expressly or implicitly include one or more of the features. In the description of the present application, "plurality" means two or more, unless otherwise expressly and specifically defined.

In the present application, the word "exemplary" is used to mean "serving as an example, illustration, or illustration." Any embodiment described in the present application as "exemplary" is not necessarily to be construed as preferred or advantageous over other embodiments. The following description is presented to enable any person skilled in the art to make and use the present application. In the following description, details are set forth for the purpose of explanation. It is to be understood that one of ordinary skill in the art can realize that the present application may be practiced without the use of these specific details. In other instances, well-known structures and procedures have not been described in detail so as not to obscure the description of the present application with unnecessary detail. Therefore, the present application is not intended to limit to the embodiments shown but is to be accorded the widest scope consistent with the principles and features disclosed herein.

An embodiment of the present application provides a backlight module and a display device, which will be described in detail below.

Figure 1:
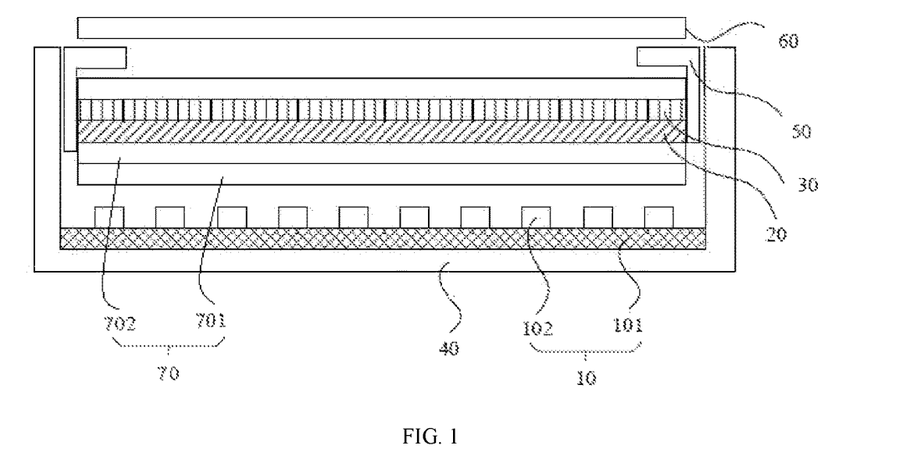
FIG. 1 is a schematic structural view of a backlight module in an embodiment of the present application.

Please refer to FIG. 1, which is a schematic structural view of a backlight module provided by an embodiment of the present application. In the embodiment shown in FIG. 1, the backlight module may include:

a light source component 10, a quantum dot component 20, the quantum dot component 20 is arranged above the light source component 10 to receive light emitted by a light source.

a wavelength-band-light-reflecting component 30, the wavelength-band-light-reflecting component is disposed above the quantum dot component 20, and the wavelength-band-light-reflecting component reflects light in a specific band range to reduce full width at half maximum of the light.

The backlight module provided by the embodiment of the present application includes the light source component, the quantum dot component, and the wavelength-band-light-reflecting component arranged in a stack. The wavelength-band-light-reflecting component can reflect the light emitted by the quantum dot component in a specific band range, so as to reduce the full width at half maximum of the light. The smaller the full width at half maximum of the light is, the purer monochromatic light is, and the more color light the display module can display, that is, the higher the gamut of the display module is. The present application reduces full width at half maximum of monochromatic light by arranging the wavelength-band-light-reflecting component that reflects light in a specific band range, thereby increasing the gamut of the display module.

Please refer to FIG. 1 for details. In FIG. 1, the light source component 10, the quantum dot component 20, and the wavelength-band-light-reflecting component 30 are arranged in a stack. And the wavelength-band-light-reflecting component 30 is arranged above the quantum dot component 20. In the embodiment shown in FIG. 1, compared with a display module in the prior art, the wavelength-band-light-reflecting component 30 is added. The wavelength-band-light-reflecting component 30 can reflect light in the specific band range to reduce the full width at half maximum of the light (usually monochromatic light).

Wherein, the full width at half maximum (full width at half maximum refers to a peak width at a general peak height of a chromatographic peak, that is, a distance between two points where a straight line intersects both sides of the peak, wherein the straight line is parallel to a peak bottom through a midpoint of the peak height. Generally speaking, the smaller the full width at half maximum is, the purer a color of monochromatic light is, then the more colors that can be displayed after the three primary colors (i.e., RGB) are mixed, the higher the gamut of the display module is.

Figure 2:
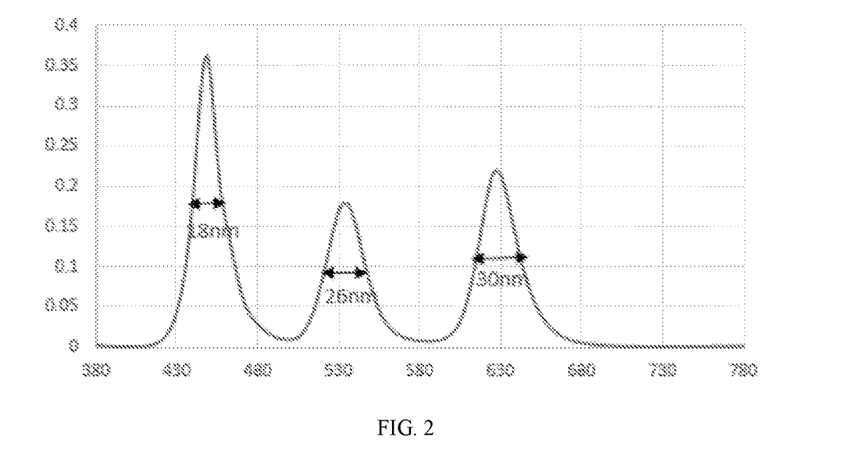
FIG. 2 is a schematic view of a backlight spectrum of a conventional display module in an embodiment of the present application.
Figure 3:
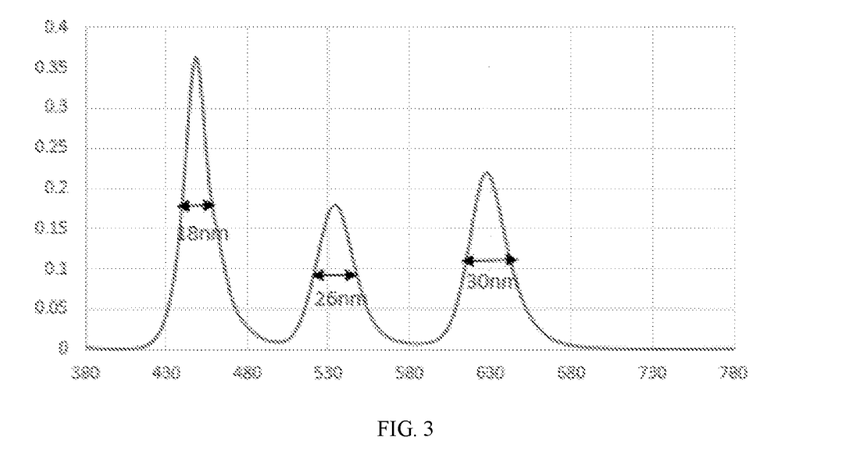
FIG. 3 is a schematic view of a backlight spectrum of the backlight module in an embodiment of the present application.

As shown in FIG. 2, it is a schematic view of a backlight spectrum of a conventional display module. In FIG. 2, in the conventional display module that includes a quantum dot component, full widths at half maximum corresponding to RGB color light are 30 nm, 26 nm, and 18 nm, respectively. As shown in FIG. 3, it is a schematic view of a backlight spectrum of the backlight module in an embodiment of the present application. In FIG. 3, full widths at half maximum corresponding to the RGB color light are 36 nm, 26 nm, and 18 nm, respectively. It can be clearly seen from FIG. 2 and FIG. 3 that compared with the prior art, the backlight module provided by the embodiment of the present application can reduce the full width at half maximum corresponding to the monochromatic light effectively, so as to improve the gamut of the display module.

Figure 4:
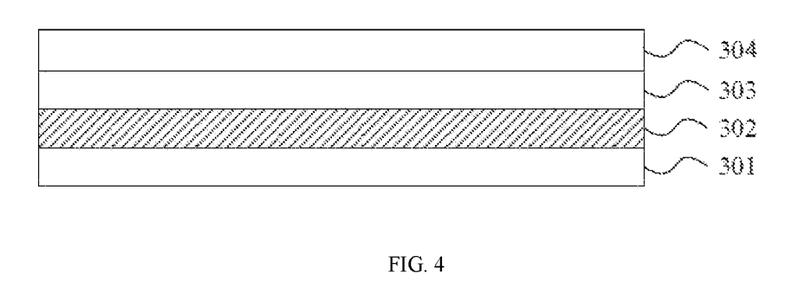
FIG. 4 is a schematic view of a wavelength-band-light-reflecting component in an embodiment of the present application.

As shown in FIG. 4, it is a schematic view of the wavelength-band-light-reflecting component in an embodiment of the present application. In the embodiment shown in FIG. 4, the wavelength-band-light-reflecting component 30 may further include a substrate layer 301; a reflective layer 302, the reflective layer is arranged above the substrate layer 301 and the substrate layer 301 supports the reflective layer 302, and the reflective layer 302 reflects light in a specific band range; and a passivation layer 303, the passivation layer 303 is arranged above the reflective layer 302 to protect the reflective layer 302.

Please refer to FIG. 4 for details, the wavelength-band-light-reflecting component 30 shown in FIG. 4 is actually a multi-layer structure, that is, the wavelength-band-light-reflecting component 30 may include the substrate layer 301, the reflective layer 302, and the passivation layer 303 arranged in a stack. In the multi-film structure, the reflective layer 302 actually plays a role of reflecting light in the specific band range.

Of course, in some other embodiments, the wavelength-band-light-reflecting component 30 may only include the reflective layer 302, but during a practical preparation and use, problems are more easily to occur for the wavelength-band-light-reflecting component 30 only including the reflective layer 302 compared with the wavelength-band-light-reflecting component 30 including the substrate layer 301, the reflective layer 302, and the passivation layer 303. Therefore, a commonly used wavelength-band-light-reflecting component 30 includes the substrate layer 301 for supporting, the reflective layer 302 for reflecting light in the specific band range, and the passivation layer 303 for protecting the reflective layer 302.

Figure 5:
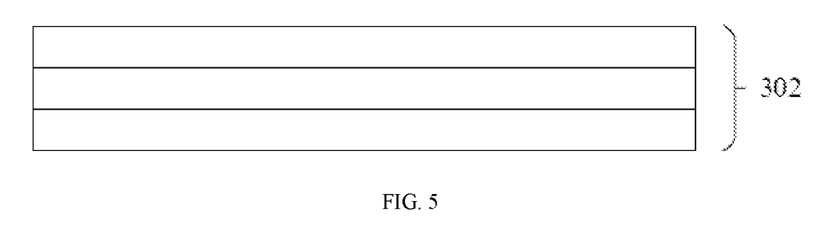
FIG. 5 is a schematic structural view of a reflective layer in an embodiment of the present application.

As shown in FIG. 5, it is a schematic structural view of the reflective layer in an embodiment of the present application. In the embodiment shown in FIG. 5, the reflective layer 302 may also have a multi-layer structure, that is, the reflective layer 302 may further include a plurality of sub-reflective layers. Wherein, different sub-reflective layers of the plurality of sub-reflective layers are used to reflect light in different band ranges.

Please refer to FIG. 5, in the embodiment shown in FIG. 5, the reflective layer 302 may include three different sub-reflective layers arranged in a stack, and different sub-reflective layers can reflect light in different band ranges. Refractive indices corresponding to different sub-reflective layers in the multi-layer structure are different. Specifically, the sub-reflective layers can be three layers, and different sub-reflective layers in the three-sub-reflective layers respectively reflect light in different band ranges. Or different sub-reflective layers in the three-layer sub-reflective layers can reflect red light, green light, and blue light respectively.

That is, in the embodiment of the present application, a plurality of different sub-reflective layers can be prepared by using materials with different refractive indices. And the different sub-reflective layers are stacked and arranged to obtain the reflective layer 302 in the wavelength-band-light-reflecting component 30. At this time, different sub-reflective layers in the reflective layer 302 can reflect light of different colors in different band ranges, respectively.

In the above embodiment, when the reflective layer 302 includes a plurality of sub-reflective layers, each sub-reflective layer of the plurality of sub-reflective layers is a film layer with an adjustable thickness. That is, thicknesses of the film layers that reflect different band ranges in the reflective layer 302 can be adjusted according to an actual situation, and the thickness of each sub-reflective layer of the plurality of sub-reflective layers is randomly set. In addition, the number of the plurality of sub-reflective layers can also be adjusted according to the actual situation, and the number of the plurality of sub-reflective layers is also randomly set.

The reflective layer 302 in the above embodiment can reflect a variety of different monochromatic light at a same time. In other embodiments, the reflective layer 302 also includes a plurality of sub-reflective layers, but the plurality of sub-reflective layers can only reflect monochromatic light of one color. That is, the reflective layer 302 in the embodiment of the present application generally includes a plurality of sub-reflective layers, and the plurality of sub-reflective layers can simultaneously reflect a variety of different monochromatic light, or can reflect only monochromatic light of one color at a same time.

When the reflective layer 302 can only reflect monochromatic light of one color, refractive indices of different sub-reflective layers of the reflective layer 302 are same. In a specific embodiment, the reflective layer 302 can reflect red monochromatic light, so as to reduce full width at half maximum of the red monochromatic light by 4 nm, which in fact is achieved by reducing the full width at half maximum of the red monochromatic light by 0.1-0.2 nm in each sub-reflective layer of the plurality of sub-reflective layers. That is, when the reflective layer 302 can only reflect monochromatic light, the purpose of reducing the full width at half maximum of the monochromatic light is achieved by superimposing reflection effects on the plurality of sub-reflective layers.

When the reflective layer 302 can reflect a plurality of different monochromatic light at a same time, the plurality of sub-reflective layers in the reflective layer 302 can be made of different materials with different refractive indices. Sub-reflective layers made of a same material can reflect monochromatic light of one color, and the reflective layer 302 includes the plurality of sub-reflective layers made of different materials, so it can reflect light in different specific band ranges at a same time, namely, to reflect monochromatic light of different colors.

It should be noted that, in the embodiments of the present application, the reflective layer 302 generally includes the plurality of sub-reflective layers made of different materials to reflect light in different band ranges. Even if the reflective layer 302 can reduce the full widths at half maximum of a variety of monochromatic light at a same time, for a definite monochromatic light, the purpose of reducing the full width at half maximum of the monochromatic light is achieved by superimposing reflection effects on the plurality of sub-reflective layers made of a same material.

That is, in the embodiment of the present application, whether the reflective layer 302 only reduces full width at half maximum of one type of monochromatic light or reduces full widths at half maximum of the plurality of monochromatic light at a same time, both are achieved by superimposing reflection effects on the plurality of sub-reflective layers. When the reflective layer 302 only reduces the full width at half maximum of one type of monochromatic light, the reflective layer 302 includes a plurality of sub-reflective layers made of a same material.

When the reflective layer 302 reduces the full widths at half maximum of plurality of monochromatic light at a same time, the plurality of sub-reflective layers in the reflective layer 302 are made of different materials with different refractive indices. The plurality of sub-reflective layers made of different materials are alternately disposed.

Meanwhile, in the embodiment of the present application, a number of the plurality of sub-reflective layers in the reflective layer 302 is generally greater than 200.

In a specific embodiment, the reflective layer 302 may include three sub-reflective layers, and the reflective layer 302 may be used to reflect three RGB monochromatic light at a same time, that is, to change the full widths at half maximum of the three RGB monochromatic light at the same time. Of course, the reflective layer 302 may also include three sub-reflective layers, but in this case, the reflective layer 302 reflects the monochromatic light of any color of R/G/B separately.

In the embodiment of the present application, an overall thickness of the reflective layer 302 is 240 microns to 400 microns. When the reflective layer 302 includes the plurality of sub-reflective layers, a sum of the thicknesses of the plurality of sub-reflective layers is also in a range of 240 microns to 400 microns.

In the embodiment of the present application, a light-emitting layer 304 may also be disposed above the passivation layer 303 to enhance the light emitted from the reflective layer. Specifically, the light-emitting layer 304 may include a prism structure or a protrusion, the prism structure or the protrusion are both for improving a light extraction efficiency, thereby improving brightness of the display module. The prism structure or protrusion can be disposed corresponding to quantum dots in the quantum dot component.

Please refer to FIG. 1, the backlight module shown in FIG. 1 may specifically include: a backlight backplane 40. The light source component 10 may include a light source substrate 101 and a light source 102. The light source 102 is a main component that emits monochromatic light. The light source 102 is arranged on the backlight backplane 40.

The backlight module may further include a light diffusing component 70 disposed above the light source component 10, and the light diffusing component 70 is used to convert the light emitted by the light source component 10 into horizontal light, thereby providing a uniform surface light source. In a specific embodiment, the light diffusing component 70 may include a diffusing plate 701 and a diffusing sheet 702 arranged in a stack and above the light source. Both the diffusing plate 701 and the diffusing sheet 702 convert light emitted by the light source component 10 into uniform and parallel light; that is, to provide a uniform planar light source. The quantum dot component 20 is arranged above the diffusing sheet 702. And the wavelength-band-light-reflecting component 30 is arranged above the quantum dot component 20.

Other structures of the display module are also arranged above the wavelength-band-light-reflecting component 30, such as a film layer for improving the light extraction efficiency and a film layer for protecting the display module. For details, please refer to the prior art, which will not be repeated here. The backlight module further includes a middle frame 50; the light source component 10 mentioned above, the quantum dot component 20, and the wavelength-band-light-reflecting component 30 are all disposed inside an accommodating space defined by the middle frame 50 and the backlight backplane 40. At a same time, the backlight module further includes a display screen 60 for displaying images, and the display screen 60 is usually disposed outside the accommodating space defined by the middle frame 50 and the backlight backplane 40.

In the above embodiment, the light emitted by the light source 102 first reaches the quantum dot component 20 after being diffused by the diffusing plate and the diffusing sheet, and simultaneously excites the quantum dots in the quantum dot component to generate monochromatic light of other colors. After a variety of monochromatic light are generated, the variety of different monochromatic light reach the waveband-light-reflecting component 30, and after being reflected by the waveband-light-reflecting component, full widths at half maximum corresponding to some of the monochromatic light are reduced, and finally reaches the display screen. The variety of monochromatic light are mixed in the display screen to obtain a variety of different colors, which improves the gamut of the display module.

It should be noted that, in the embodiments of the present application, the light emitted by the light source component 10 are all monochromatic light, and after the monochromatic light passes through the quantum dot component 20, the quantum dots in the quantum dot component 20 are excited to obtain monochromatic light of other colors. Monochromatic light of different colors can be mixed to obtain more colors.

After many monochromatic light of different colors pass through the wavelength-band-light-reflecting component 30, the wavelength-band-light-reflecting component 30 will reflect the monochromatic light in a specific band range, so as to reduce the full width at half maximum of the monochromatic light. After the monochromatic light with different full widths at half maximum are mixed, more colors can be obtained, thereby improving the gamut of the display module.

In a specific embodiment, the quantum dot component 20 includes red (R) quantum dots, green (G) quantum dots, and blue (B) quantum dots. And the light source component is a blue light LED that can emit blue monochromatic light. The blue monochromatic light excites the R quantum dots and the G quantum dots after passing through the quantum dot component 20 to generate red monochromatic light and green monochromatic light. When the red monochromatic light, blue monochromatic light, and green monochromatic light pass through the wavelength-band-light-reflecting component 30, the wavelength-band-light-reflecting component 30 will reflect the red monochromatic light/blue monochromatic light/green monochromatic light in a specific band range, thereby reducing the full widths at half maximum of the red monochromatic light, the blue monochromatic light, and the green monochromatic light to obtain more monochromatic light with different full widths at half maximum. After these monochromatic light with different full widths at half maximum are mixed, more colors of monochromatic light can be obtained, thereby increasing the gamut of the display module.

An embodiment of the present application further comprises a display device, which includes the backlight module described above. Specifically, please refer to FIG. 1, FIG. 1 is a schematic structural view of a backlight module in an embodiment of the present application. In the embodiment shown in FIG. 1, the backlight module may include:

a light source component 10.

a quantum dot component 20, the quantum dot component is disposed above the light source component 10 to receive the light emitted by a light source.

a wavelength-band-light-reflecting component 30, the wavelength-band-light-reflecting component 30 is disposed above the quantum dot component 20, and wavelength-band-light-reflecting component reflects light in a specific band range to reduce the full width at half maximum of the light.

The display device provided by the embodiment of the present application includes the light source component, the quantum dot component, and the wavelength-band-light-reflecting component arranged in a stack, and the wavelength-band-light-reflecting component can reflect the light emitted by the quantum dot component in the specific band range, so as to reduce the full width at half maximum of the light. The smaller the full width at half maximum of the light is, the purer the monochromatic light is, and the amount of color light the display module can display is larger, that is, the higher the gamut of the display module is. The present application reduces the full width at half maximum of the monochromatic light by arranging the wavelength-band-light-reflecting component that reflects light in the specific band range, thereby increasing the gamut of the display module.

Please refer to FIG. 1 for details. In FIG. 1, the light source component 10, the quantum dot component 20, and the wavelength-band-light-reflecting component 30 are arranged in a stack, and the wavelength-band-light-reflecting component 30 is arranged above the quantum dot component 20. In the embodiment shown in FIG. 1, compared with the display module in the prior art, the wavelength-band-light-reflecting component 30 is added. The wavelength-band-light-reflecting component 30 can reflect light in a specific band range to reduce the full width at half maximum of the light (usually monochromatic light).

Wherein, the full width at half maximum (full width at half maximum) refers to a peak width at a general peak height of a chromatographic peak, that is, a distance between two points where a straight line intersects both sides of the peak, wherein the straight line is parallel to a peak bottom through a midpoint of the peak height. Generally speaking, the smaller the full width at half maximum is, the purer a color of monochromatic light is, then the more colors that can be displayed after the three primary colors (i.e., RGB) are mixed, the higher the gamut of the display module is.

As shown in FIG. 2, it is a schematic view of a backlight spectrum of a conventional display module. In FIG. 2, in the conventional display module that includes a quantum dot component, full widths at half maximum corresponding to RGB color light are 30 nm, 26 nm, and 18 nm, respectively. As shown in FIG. 3, it is a schematic view of a backlight spectrum of the backlight module in an embodiment of the present application. In FIG. 3, full widths at half maximum corresponding to the RGB color light are 36 nm, 26 nm, and 18 nm, respectively. It can be clearly seen from FIG. 2 and FIG. 3 that compared with the prior art, the backlight module provided by the embodiment of the present application can reduce the full width at half maximum corresponding to the monochromatic light effectively, so as to improve the gamut of the display module.

As shown in FIG. 4, it is a schematic view of the wavelength-band-light-reflecting component in an embodiment of the present application. In the embodiment shown in FIG. 4, the wavelength-band-light-reflecting component 30 may further include a substrate layer 301; a reflective layer 302, the reflective layer is arranged above the substrate layer 301 and the substrate layer 301 supports the reflective layer 302, and the reflective layer 302 reflects light in a specific band range; and a passivation layer 303, the passivation layer 303 is arranged above the reflective layer 302 to protect the reflective layer 302.

Please refer to FIG. 4 for details, the wavelength-band-light-reflecting component 30 shown in FIG. 4 is actually a multi-layer structure, that is, the wavelength-band-light-reflecting component 30 may include the substrate layer 301, the reflective layer 302 and the passivation layer 303 arranged in a stack. In the multi-film structure, the reflective layer 302 actually plays a role of reflecting light in the specific band range.

Of course, in some other embodiments, the wavelength-band-light-reflecting component 30 may only include the reflective layer 302, but during a practical preparation and use, problems are more easily to occur for the wavelength-band-light-reflecting component 30 only including the reflective layer 302 compared with the wavelength-band-light-reflecting component 30 including the substrate layer 301, the reflective layer 302, and the passivation layer 303. Therefore, a commonly used wavelength-band-light-reflecting component 30 includes the substrate layer 301 for supporting, the reflective layer 302 for reflecting light in the specific band range, and the passivation layer 303 for protecting the reflective layer 302.

As shown in FIG. 5, it is a schematic structural view of the reflective layer in an embodiment of the present application. In the embodiment shown in FIG. 5, the reflective layer 302 may also have a multi-layer structure, that is, the reflective layer 302 may further include a plurality of sub-reflective layers. Wherein, different sub-reflective layers of the plurality of sub-reflective layers are used to reflect light in different band ranges.

Please refer to FIG. 5, in the embodiment shown in FIG. 5, the reflective layer 302 may include three different sub-reflective layers arranged in a stack, and different sub-reflective layers can reflect light in different band ranges. Refractive indices corresponding to different sub-reflective layers in the multi-layer structure are different. Specifically, the sub-reflective layers can be three layers, and different sub-reflective layers in the three-sub-reflective layers respectively reflect light in different band ranges. Or different sub-reflective layers in the three-layer sub-reflective layers can reflect red light, green light, and blue light respectively.

That is, in the embodiment of the present application, a plurality of different sub-reflective layers can be prepared by using materials with different refractive indices. And the different sub-reflective layers are stacked and arranged to obtain the reflective layer 302 in the wavelength-band-light-reflecting component 30. At this time, different sub-reflective layers in the reflective layer 302 can reflect light of different colors in different band ranges, respectively.

In the above embodiment, when the reflective layer 302 includes a plurality of sub-reflective layers, each sub-reflective layer of the plurality of sub-reflective layers is a film layer with an adjustable thickness. That is, thicknesses of the film layers that reflect different band ranges in the reflective layer 302 can be adjusted according to an actual situation, and the thickness of each sub-reflective layer of the plurality of sub-reflective layers is randomly set. In addition, the number of the plurality of sub-reflective layers can also be adjusted according to the actual situation, and the number of the plurality of sub-reflective layers is also randomly set.

The reflective layer 302 in the above embodiment can reflect a variety of different monochromatic light at a same time. In other embodiments, the reflective layer 302 also includes a plurality of sub-reflective layers, but the plurality of sub-reflective layers can only reflect monochromatic light of one color. That is, the reflective layer 302 in the embodiment of the present application generally includes the plurality of sub-reflective layers, and the plurality of sub-reflective layers can simultaneously reflect a variety of different monochromatic light, or can reflect only monochromatic light of one color at a same time.

When the reflective layer 302 can only reflect monochromatic light of one color, refractive indices of different sub-reflective layers of the reflective layer 302 are same. In a specific embodiment, the reflective layer 302 can reflect red monochromatic light, so as to reduce full width at half maximum of the red monochromatic light by 4 nm, which in fact is achieved by reducing the full width at half maximum of the red monochromatic light by 0.1-0.2 nm in each sub-reflective layer of the plurality of sub-reflective layers. That is, when the reflective layer 302 can only reflect monochromatic light, the purpose of reducing the full width at half maximum of the monochromatic light is achieved by superimposing reflection effects on the plurality of sub-reflective layers.

When the reflective layer 302 can reflect a plurality of different monochromatic light at a same time, the plurality of sub-reflective layers in the reflective layer 302 can be made of different materials with different refractive indices. Sub-reflective layers made of a same material can reflect monochromatic light of one color, and the reflective layer 302 includes the plurality of sub-reflective layers made of different materials, so it can reflect light in different specific band ranges at a same time, namely, to reflect monochromatic light of different colors.

It should be noted that, in the embodiments of the present application, the reflective layer 302 generally includes the plurality of sub-reflective layers made of different materials to reflect light in different band ranges. Even if the reflective layer 302 can reduce the full widths at half maximum of a variety of monochromatic light at a same time, for a definite monochromatic light, the purpose of reducing the full width at half maximum of the monochromatic light is achieved by superimposing reflection effects on the plurality of sub-reflective layers made of a same material.

That is, in the embodiment of the present application, whether the reflective layer 302 only reduces full width at half maximum of one type of monochromatic light or reduces full widths at half maximum of the plurality of monochromatic light at a same time, both are achieved by superimposing reflection effects on the plurality of sub-reflective layers. When the reflective layer 302 only reduces the full width at half maximum of one type of monochromatic light, the reflective layer 302 includes a plurality of sub-reflective layers made of a same material.

When the reflective layer 302 reduces the full widths at half maximum of plurality of monochromatic light at a same time, the plurality of sub-reflective layers in the reflective layer 302 are made of different materials with different refractive indices. The plurality of sub-reflective layers made of different materials are alternately disposed.

Meanwhile, in the embodiment of the present application, a number of the plurality of sub-reflective layers in the reflective layer 302 is generally greater than 200.

In a specific embodiment, the reflective layer 302 may include three sub-reflective layers, and the reflective layer 302 may be used to reflect three RGB monochromatic light at a same time, that is, to change the full widths at half maximum of the three RGB monochromatic light at the same time. Of course, the reflective layer 302 may also include three sub-reflective layers, but in this case, the reflective layer 302 reflects the monochromatic light of any color of R/G/B separately.

In the embodiment of the present application, an overall thickness of the reflective layer 302 is 240 microns to 400 microns. When the reflective layer 302 includes the plurality of sub-reflective layers, a sum of the thicknesses of the plurality of sub-reflective layers is also in a range of 240 microns to 400 microns.

In the embodiment of the present application, a light-emitting layer 304 may also be disposed above the passivation layer 303 to enhance the light emitted from the reflective layer. Specifically, the light-emitting layer 304 may include a prism structure or a protrusion, the prism structure or the protrusion are both for improving a light extraction efficiency, thereby improving brightness of the display module. The prism structure or protrusion can be disposed corresponding to quantum dots in the quantum dot component.

Please refer to FIG. 1, the backlight module shown in FIG. 1 may specifically include: a backlight backplane 40. The light source component 10 may include a light source substrate 101 and a light source 102. The light source 102 is a main component that emits monochromatic light. The light source 102 is arranged on the backlight backplane 40.

The backlight module may further include a light diffusing component 70 disposed above the light source component 10, and the light diffusing component 70 is used to convert the light emitted by the light source component 10 into horizontal light, thereby providing a uniform surface light source. In a specific embodiment, the light diffusing component 70 may include a diffusing plate 701 and a diffusing sheet 702 arranged in a stack and above the light source. Both the diffusing plate 701 and the diffusing sheet 702 convert light emitted by the light source component 10 into uniform and parallel light; that is, to provide a uniform planar light source. The quantum dot component 20 is arranged above the diffusing sheet 702. And the wavelength-band-light-reflecting component 30 is arranged above the quantum dot component 20.

Other structures of the display module are also arranged above the wavelength-band-light-reflecting component 30, such as a film layer for improving the light extraction efficiency and a film layer for protecting the display module. For details, please refer to the prior art, which will not be repeated here. The backlight module further includes a middle frame 50; the light source component 10 mentioned above, the quantum dot component 20, and the wavelength-band-light-reflecting component 30 are all disposed inside an accommodating space defined by the middle frame 50 and the backlight backplane 40. At a same time, the backlight module further includes a display screen 60 for displaying images, and the display screen 60 is usually disposed outside the accommodating space defined by the middle frame 50 and the backlight backplane 40.

In the above embodiment, the light emitted by the light source 102 first reaches the quantum dot component 20 after being diffused by the diffusing plate and the diffusing sheet, and simultaneously excites the quantum dots in the quantum dot component to generate monochromatic light of other colors. After a variety of monochromatic light are generated, the variety of different monochromatic light reach the waveband-light-reflecting component 30, and after being reflected by the waveband-light-reflecting component, full widths at half maximum corresponding to some of the monochromatic light are reduced, and finally reaches the display screen. The variety of monochromatic light are mixed in the display screen to obtain a variety of different colors, which improves the gamut of the display module.

It should be noted that, in the embodiments of the present application, the light emitted by the light source component are all monochromatic light, and after the monochromatic light passes through the quantum dot component, the quantum dots in the quantum dot component are excited to obtain monochromatic light of other colors. Monochromatic light of different colors can be mixed to obtain more colors.

After many monochromatic light of different colors pass through the wavelength-band-light-reflecting component, the wavelength-band-light-reflecting component 30 will reflect the monochromatic light in a specific band range, so as to reduce the full width at half maximum of the monochromatic light. After the monochromatic light with different full widths at half maximum are mixed, more colors can be obtained, thereby improving the gamut of the display module.

In a specific embodiment, the quantum dot component 20 includes red (R) quantum dots, green (G) quantum dots, and blue (B) quantum dots. And the light source component is a blue light LED that can emit blue monochromatic light. The blue monochromatic light excites the R quantum dots and the G quantum dots after passing through the quantum dot component to generate red monochromatic light and green monochromatic light. When the red monochromatic light, blue monochromatic light, and green monochromatic light pass through the wavelength-band-light-reflecting component 30, the wavelength-band-light-reflecting component 30 will reflect the red monochromatic light/blue monochromatic light/green monochromatic light in a specific band range, thereby reducing the full widths at half maximum of the red monochromatic light, the blue monochromatic light, and the green monochromatic light to obtain more monochromatic light with different full widths at half maximum. After these monochromatic light with different full widths at half maximum are mixed, more colors of monochromatic light can be obtained, thereby increasing the gamut of the display module.

In the above-mentioned embodiments, the description of each embodiment has its own emphasis. For parts that are not described in detail in a certain embodiment, reference may be made to the above detailed description of other embodiments, and details are not repeated here.

During specific implementation, the above units or structures can be implemented as independent entities, or can be arbitrarily combined to be implemented as the same or several entities. The specific implementation of the above units or structures can refer to the previous method embodiments. The details are not repeated here.

For the specific implementation of the above operations, reference may be made to the foregoing embodiments, and details are not described herein again.

A backlight module and a display device provided by the embodiment of the present application have been described in detail above. The principles and implementations of the present application are described with specific examples. The description of the above embodiment is only used to help understand the present application The method of the application and its core idea; meanwhile, for those skilled in the art, according to the idea of the application, there will be changes in the specific implementation and application scope. In conclusion, the content of this specification should not be construed as a limit.

What is claimed is:

1. A backlight module, comprising:
   a light source component;
   a quantum dot component arranged on a side of the light source component to receive light emitted by a light source; and
   a wavelength-band-light-reflecting component arranged on a side of the quantum dot component away from the light source component, the wavelength-band-light-reflecting component reflecting light in a specific band range to reduce full width at half maximum of the light,
   wherein the wavelength-band-light-reflecting component comprises:
   a substrate layer;
   a reflective layer supported by the substrate layer, the reflective layer reflecting the light in the specific band range and comprising a plurality of sub-reflective layers that are stacked; and
   a passivation layer arranged on a side of the reflective layer away from the substrate layer to protect the reflective layer.

2. The backlight module as claimed in claim 1, wherein the plurality of sub-reflective layers comprise different sub-reflective layers for reflecting light in different band ranges, respectively.

3. The backlight module as claimed in claim 2, wherein the plurality of sub-reflective layers have different refractive indices, respectively.

4. The backlight module as claimed in claim 2, wherein the plurality of sub-reflective layers comprise three sub-reflective layers.

5. The backlight module as claimed in claim 1, wherein the plurality of sub-reflective layers comprise different sub-reflective layers each having a same refractive index.

6. The backlight module as claimed in claim 1, wherein a thickness of the reflective layer is 240 microns to 400 microns.

7. The backlight module as claimed in claim 1, wherein the wavelength-band-light-reflecting component further comprises a light-emitting layer arranged on a side of the passivation layer away from the reflective layer to enhance light emitted by the reflective layer.

8. The backlight module as claimed in claim 1, wherein the backlight module further comprises a light diffusing component arranged between the light source component and the quantum dot component to create a uniform planar light source.

9. A display device, comprising:
a display panel; and
a backlight module,
wherein the backlight module comprises:
a light source component;
a quantum dot component arranged on a side of the light source component to receive light emitted by a light source; and
a wavelength-band-light-reflecting component arranged on a side of the quantum dot component away from the light source component, the wavelength-band-light-reflecting component reflecting light in a specific band range to reduce full width at half maximum of the light,
wherein the wavelength-band-light-reflecting component comprises:
a substrate layer;
a reflective layer supported by the substrate layer, the reflective layer reflecting the light in the specific band range and comprising a plurality of sub-reflective layers that are stacked; and
a passivation layer arranged on a side of the reflective layer away from the substrate layer to protect the reflective layer.

10. The display device as claimed in claim 9, wherein the plurality of sub-reflective layers comprise different sub-reflective layers for reflecting light in different band ranges, respectively.

11. The display device as claimed in claim 10, wherein the plurality of sub-reflective layers have different refractive indices, respectively.

12. The display device as claimed in claim 10, wherein the plurality of sub-reflective layers comprise three sub-reflective layers.

13. The display device as claimed in claim 9, wherein the plurality of sub-reflective layers comprise different sub-reflective layers each having a same refractive index.

14. The display device as claimed in claim 9, wherein a thickness of the reflective layer is 240 microns to 400 microns.

15. The display device as claimed in claim 9, wherein the wavelength-band-light-reflecting component further comprises a light-emitting layer arranged on a side of the passivation layer away from the reflective layer to enhance light emitted by the reflective layer.

16. The display device as claimed in claim 9, wherein the backlight module further comprises a light diffusing component arranged between the light source component and the quantum dot component to create a uniform planar light source.

* * * * *